(12) United States Patent
Dubhashi et al.

(10) Patent No.: US 6,650,098 B2
(45) Date of Patent: Nov. 18, 2003

(54) CURRENT LIMITED BUCK POWER SUPPLY

(75) Inventors: Ajit Dubhashi, Redondo Beach, CA (US); Vijay Bolloju, Cerritos, CA (US); Bertrand Vaysse, Cerritos, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/935,578

(22) Filed: Aug. 24, 2001

(65) Prior Publication Data

US 2002/0024827 A1 Feb. 28, 2002

Related U.S. Application Data

(60) Provisional application No. 60/227,534, filed on Aug. 24, 2000.

(51) Int. Cl.[7] .................................................. G05F 1/56
(52) U.S. Cl. ...................................................... 323/282
(58) Field of Search ................................. 323/265, 282, 323/285

(56) References Cited

U.S. PATENT DOCUMENTS

| | | | | |
|---|---|---|---|---|
| 3,877,300 A | * | 4/1975 | Ginns | 73/136 A |
| 4,196,381 A | * | 4/1980 | Standing | |
| 4,317,651 A | * | 3/1982 | Marshall et al. | 434/22 |
| 5,239,318 A | * | 8/1993 | Vannerson | 346/159 |
| 5,313,381 A | * | 5/1994 | Balakrishnan | 363/147 |
| 5,675,485 A | * | 10/1997 | Seong | 363/97 |
| 5,744,943 A | * | 4/1998 | Tokai | 323/282 |
| 5,841,643 A | * | 11/1998 | Schenkel | 323/282 |
| 5,977,753 A | * | 11/1999 | Edwards et al. | 323/222 |
| 5,994,885 A | * | 11/1999 | Wilcox et al. | 323/285 |
| 6,081,460 A | * | 6/2000 | Lim et al. | 365/189.11 |
| 6,313,616 B1 | * | 11/2001 | Deller et al. | 323/282 |
| 6,324,079 B1 | * | 11/2001 | Collmeyer et al. | 363/21.15 |
| 6,369,555 B2 | * | 4/2002 | Rincon-Mora | 323/282 |

* cited by examiner

*Primary Examiner*—Jeffrey Sterrett
(74) *Attorney, Agent, or Firm*—Ostrolenk, Faber, Gerb & Soffen, LLP

(57) ABSTRACT

A novel power supply control circuit topology uses a standard power supply controller to control a high side switch in an electronic circuit. A feedback voltage referenced to ground (or negative bus level) is level-shifted to a high side controller by means of a diode/capacitor/resistor network. Power to the high side controller is supplied by using the feedback output voltage. The circuit can be used instead of conventional flyback converters, particularly in low voltage applications. The circuit requires fewer pins on the transformer/inductor, leading to lower cost and size, particularly as compared to prior art flyback converters. Lower voltage rating required for the switch reduces noise and losses in the device.

8 Claims, 2 Drawing Sheets

CURRENT LIMITED BUCK POWER SUPPLY

This application claims the benefit of U.S. Provisional Application No. 60/227,534, filed Aug. 24, 2000.

FIELD OF THE INVENTION

This invention relates to power supplies and more particularly relates to a novel control power supply for circuits containing high side switches.

BACKGROUND OF THE INVENTION

Most power electronic equipment requires a control power supply that supplies power (5–20 w) for the control and drive circuits of the device. Typically, a flyback or a buck converter is used to provide the control power.

Referring to FIG. 1, a circuit diagram of a conventional flyback converter 2 is shown. In a typical application, flyback converter 2 is provided with a 300V input connected across a relatively large transformer 4. An extra clamp circuit 16 is required, such as would be provided by the arrangement of diode 6, resistor 8 and capacitor 10. A FET 12 is controlled by controller 14. The FET requires a breakdown voltage much greater than 300 V, typically from 450–660 V.

Another conventional solution, a buck power supply, is illustrated in the circuit diagram of FIG. 2. In the buck power supply of circuit 20, regulation takes place at the ground level. A level shifting driver 22 is used to drive the gate of the high side switch 24. In a 300 V application, FET 24 typically can have a voltage rating of 400 V.

The conventional circuits have various disadvantages. Flyback converters require transformers having a number of terminals, adding to size and cost. In addition, the converters have losses due to current flow through higher voltages, and thus require higher $R_{DSON}$ MOSFET switches. Conventional buck power supply topologies require a high voltage integrated circuit (HVIC).

SUMMARY OF THE INVENTION

The present invention overcomes the disadvantages of the prior art by providing a novel topology which uses a standard power supply controller to control a high side switch in an electronic circuit. In the power supply of the present invention, the feedback voltage referenced to a ground (or negative bus level) is level-shifted to a high side controller by means of a diode/capacitor/resistor network. In addition, power to a high side controller is supplied by using the feedback output voltage.

DETAILED DESCRIPTION OF THE DRAWINGS

Figure 1:
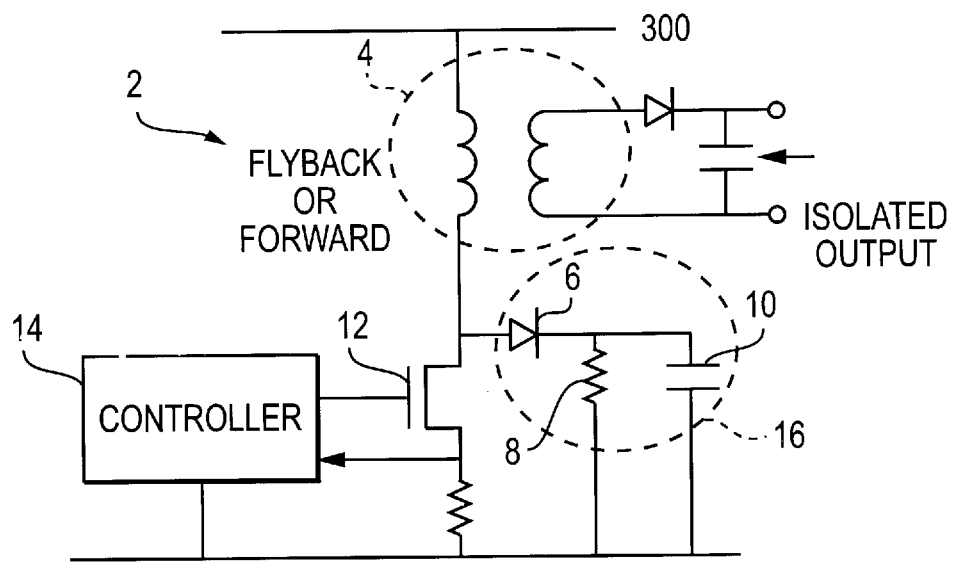
FIG. 1 is a circuit diagram of a prior art flyback power converter.
Figure 2:
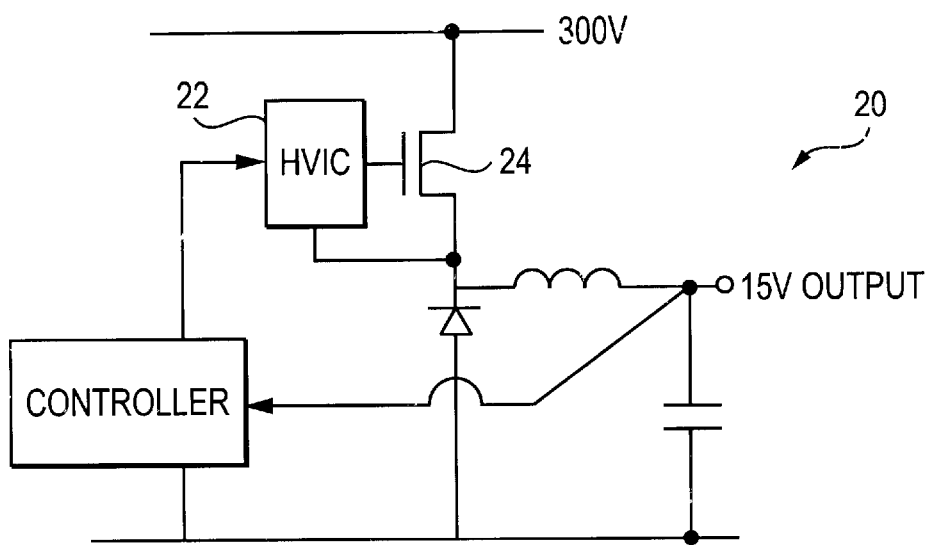
FIG. 2 is a circuit diagram of a prior art buck converter.
Figure 3:
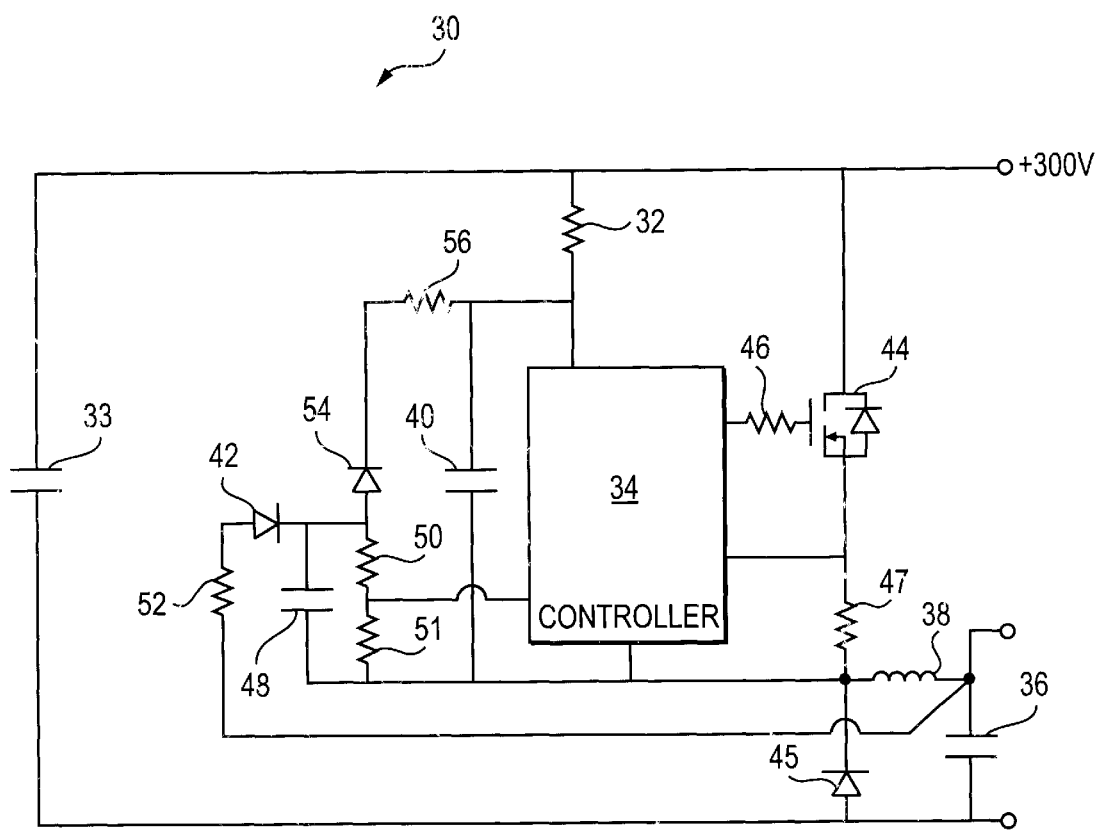
FIG. 3 is a circuit diagram of a power supply according to the present invention.

Referring now to FIG. 3, a circuit diagram for a current limited buck power supply 30 according to the present invention is shown. A resistor 32 provides the initial power, as seen across capacitor 33, to a controller 34, before an output capacitor 36 is charged through an inductor 38. After the voltage of capacitor 36 increases to exceed the voltage on capacitor 40, diode 42 starts to conduct every cycle when the main MOSFET switch 44 is off and the diode 45 is on.

Controller 34 preferably is an industry standard low voltage power supply integrated circuit such as the 3842 control chip by Motorola or Unitrode. The gate of switch 44 is connected to controller 34 by way of resistor 46. A current sense resistor 47 provides a shutdown signal for controller 34.

The output voltage (on capacitor 36) is transferred to capacitor 48 and is appropriately divided down by resistors 50 and 51 to meet input voltage requirements of the controller 34. The output voltage thus is used by controller 34 as the feedback voltage to regulate the output duty cycle of the controller.

The feedback voltage referenced to ground (or negative bus level) is level shifted to the high side controller by means of a diode 42—capacitor 48—resistor 52 network. This voltage also is used to provide the power for the controller 34 through capacitor 40 by way of diode 54 and resistor 56.

Advantageously, the circuit requires terminals than in a flyback converter, leading to lower cost and size, since the transformer included in the prior art flyback converter is eliminated.

Although the present invention has been described in relation to particular embodiments thereof, many other variations and modifications and other uses will become apparent to those skilled in the art. It is preferred, therefore, that the present invention be limited not by the specific disclosure herein.

We claim:

1. A buck converter power supply comprising:
    a first power semiconductor switching device coupled to a voltage source;
    a controller for controlling the switching operation of the first power semiconductor switching device;
    a second semiconductor device coupled in series with the first power semiconductor switching device to ground, there being a common node between the first and second semiconductor devices;
    an inductor coupled between the common node and an output capacitor, the output capacitor being connected between an output terminal of the power supply and ground;
    the controller being referenced to the common node;
    a feedback voltage being provided from the output terminal referenced to ground through a level shifting circuit to provide a control signal to the controller, the control signal being referenced to the common node; and
    the level shifting circuit comprising a diode/resistor/capacitor network.

2. The buck converter power supply of claim 1, further wherein the feedback voltage is coupled to a power terminal of the controller to power the controller after startup.

3. The buck converter power supply of claim 2, further comprising a resistor coupling the power terminal of the controller to the voltage source to provide initial startup power to the controller.

4. The buck converter power supply of claim 2, wherein the feedback voltage is coupled to the power terminal by said diode/resistor/capacitor network and a further diode.

5. The buck converter power supply of claim 1, wherein the diode/resistor/capacitor network comprises a series circuit comprising a resistor and diode coupled to receive the feedback voltage and a capacitor coupled between the series circuit and the common node to reference a level shifted feedback voltage across the capacitor to the common node.

6. The buck converter power supply of claim 5, further comprising a resistor voltage divider coupled across the capacitor to provide the control voltage to the controller.

7. The buck converter power supply of claim 1, wherein the first power semiconductor switching device comprises a MOSFET and the second semiconductor device comprises a diode.

8. The buck converter power supply of claim 1, wherein the first and second semiconductor devices are coupled together at the common node by a resistor for providing a current sense signal to the controller.

* * * * *